UNITED STATES PATENT OFFICE.

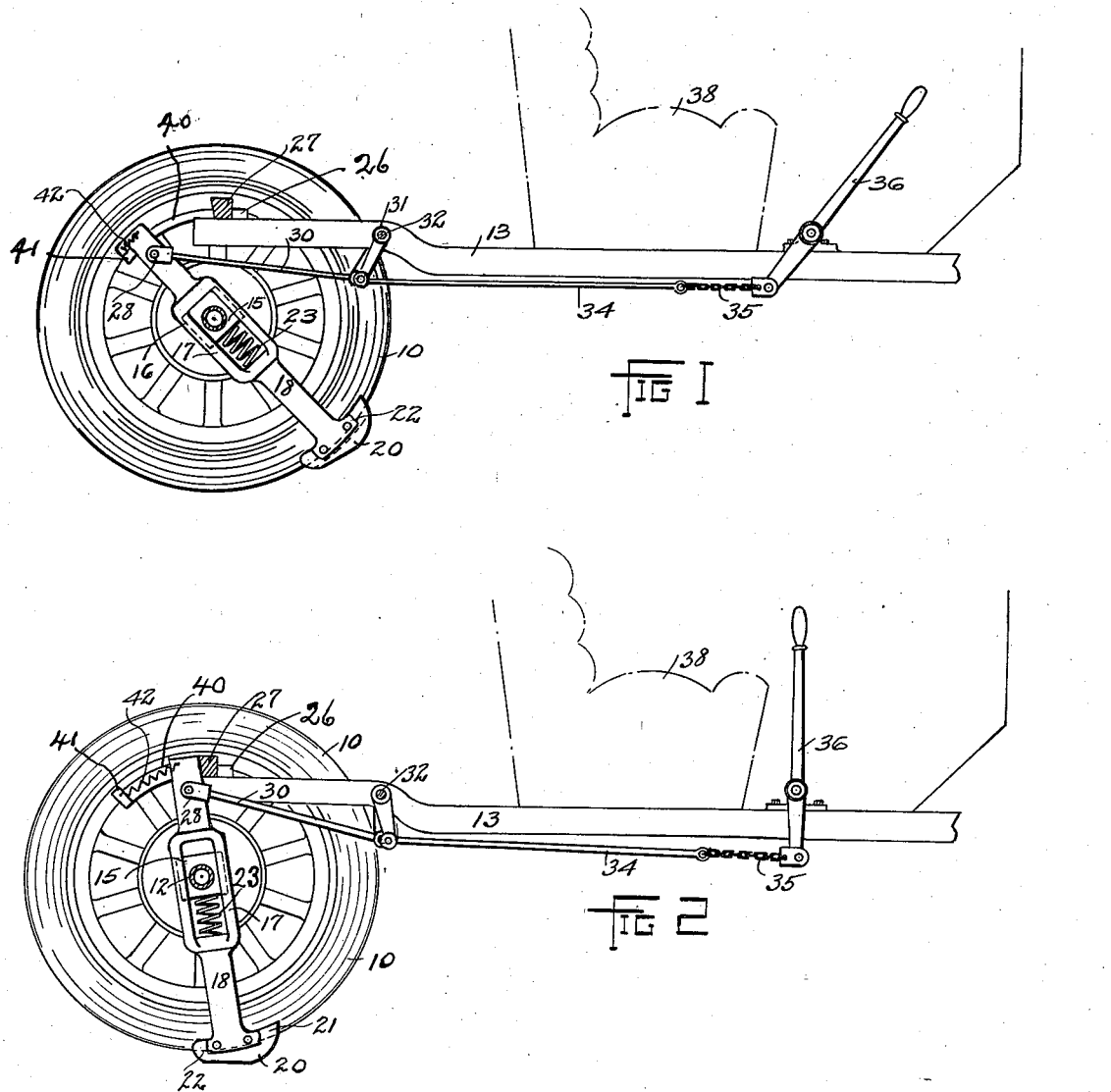

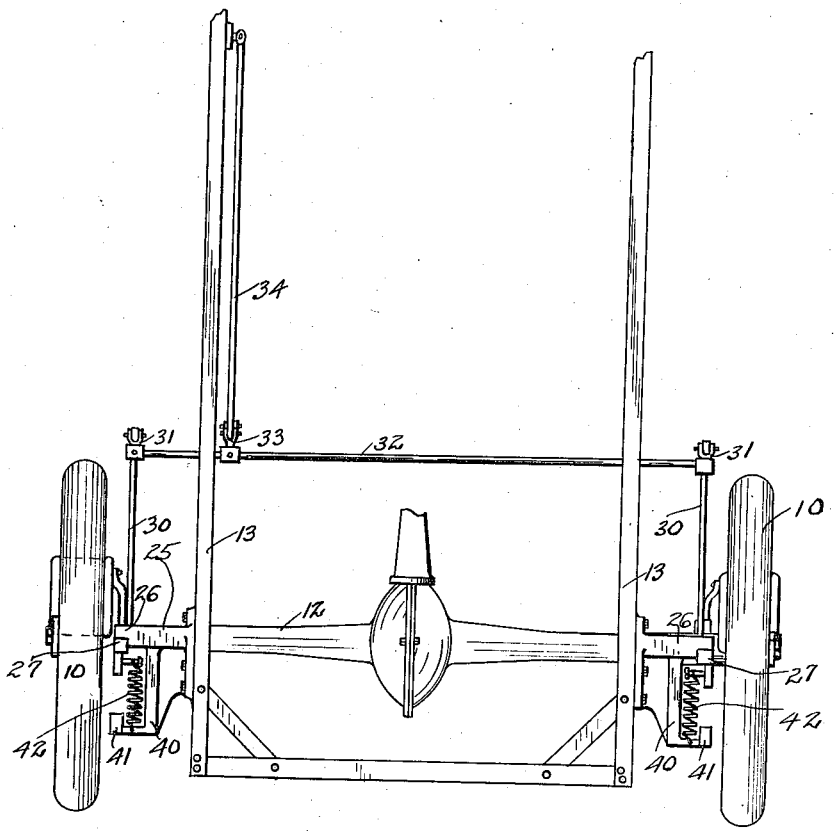
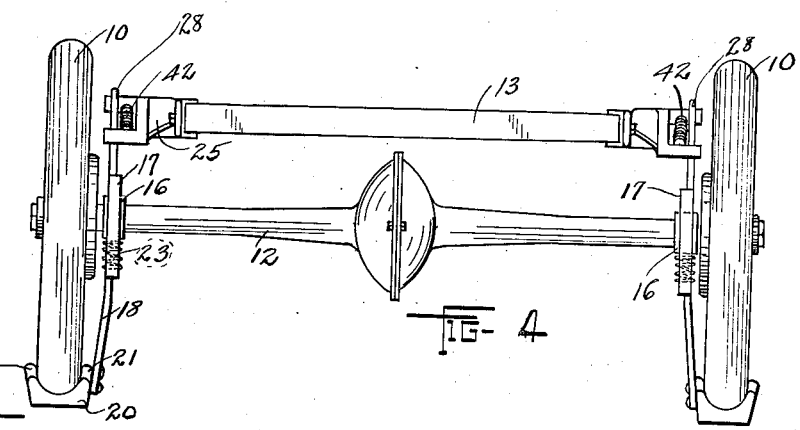

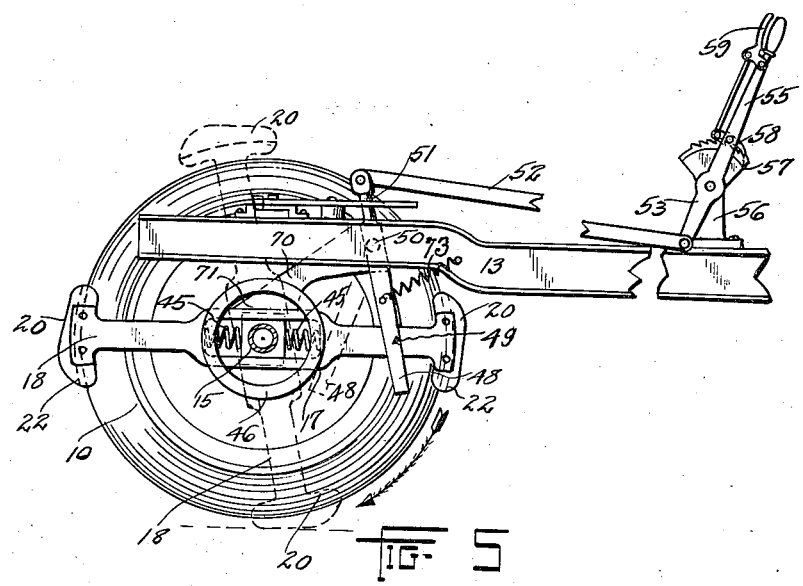
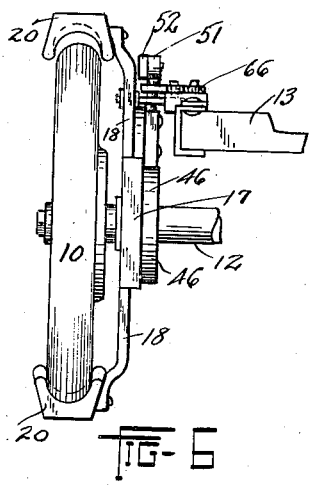
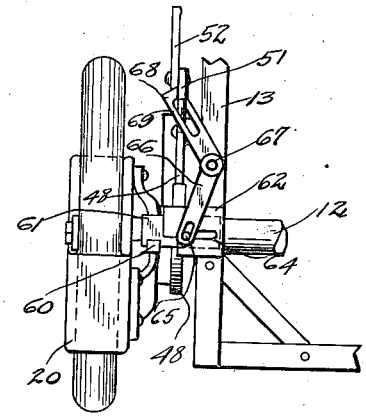

OSCAR ZERK, OF CLEVELAND, OHIO.

VEHICLE-BRAKE.

1,179,691.　　　　　Specification of Letters Patent.　　Patented Apr. 18, 1916.

Application filed August 28, 1913. Serial No. 787,072.

*To all whom it may concern:*

Be it known that I, OSCAR ZERK, a subject of the Emperor of Austria-Hungary, residing at Cleveland, in the county of Cuyahoga and State of Ohio, have invented a certain new and useful Improvement in Vehicle-Brakes, of which the following is a full, clear, and exact description, reference being had to the accompanying drawings.

This invention is for a vehicle brake.

The principal object is to provide an emergency brake which may be quickly applied to bring the vehicle to an abrupt stop in case of sudden obstruction in the roadway.

Another object is to provide a brake so effective that it may be used to stop the vehicle on a very steep grade, thus eliminating the danger of the driver losing control at such times.

Another object is to provide such a brake which will not cause the vehicle to skid when applied, and which may be used to prevent or avoid skidding on slippery pavements or on sandy roadways.

Still another object is to make such a brake of simple construction and provide means whereby it may be very easily operated.

The means by which I accomplish these objects are hereinafter described in connection with the accompanying drawings and the essential characteristics set forth in the claims.

The drawings illustrate my device as attached to an automobile with which it is particularly adapted to be used.

In the drawings, Figure 1 is a side elevation of my device attached to a vehicle, a portion of which is shown. In this view the parts comprising the brake are shown in their idle position; Fig. 2 is a similar view in which the parts are shown in their operative position; Fig. 3 is a plan view showing my device attached to each of the rear wheels of a vehicle with the parts in operative position; Fig. 4 is an end elevation of the same, also showing the parts in their operative position; Fig. 5 is a side elevation of a modified form of my device, showing a portion of the vehicle. In this view the parts are shown in their idle position, in solid lines, the operative position being indicated by broken lines. Fig. 6 is an end elevation and Fig. 7 is a plan of the same, showing the parts in their operative position.

Referring first to Figs. 1, 2, 3 and 4, the reference numeral 10 indicates the rear wheels of an automobile, mounted in the usual manner upon an axle surrounded by an axle housing 12. This housing 12 supports the frame 13 of the vehicle, by means of the usual springs, not shown.

Rotatably mounted upon the housing 12, adjacent to each rear wheel 10, is a block 15 having flanges 16 engaging the sides of a yoke 17, rigid with a lever 18. This lever 18 rigidly carries at its free end, a brake shoe 20 preferably somewhat wedge shaped in form and having its ends suitably rounded, so that it may ride over small obstructions in the roadway when in operative position. The inner surface 22 of the brake shoe may have substantially the same circumferential and transverse curvature as the tire of the wheel. The brake shoe is normally held away from the surface of the tire, so that it does not contact with it when the wheel is running. A spring 23, mounted in the yoke between the block 15 and the end of the yoke, presses outwardly on the lever to insure the shoe being held away from the tire, as described. I prefer to make these brake shoes of a hard, rough, abrasive material, as for example natural or artificial stone, which slides with great friction on smooth pavement or any sort of roadway. This insures the car or vehicle being stopped very quickly as well as practically eliminating the danger of skidding when the brake is applied, which the drivers of automobiles have found to be very dangerous.

Mounted on the frame 13 are brackets 25 having outwardly extending arms 26 carrying rubber bumpers indicated at 27. These bumpers 27 are adapted to engage an upwardly extending arm 28 of the lever 18 to limit the rotary movement of the lever and cause the brake shoe 20 to be rigidly held in its operative position between the wheel and the ground.

I provide mechanism operable from the driver's seat to throw the brake into active position. As shown, there are rods 30, pivotally attached to the arms 28 of the levers 18, at one end, and at the other end to rock arms 31 rigidly mounted on a rock shaft 32 which is suitably mounted in the frame 13 of the vehicle. Another rock arm 33 rigidly mounted on this rock shaft 32, is attached to a rod 34 leading forwardly and connected by means of a chain 35 to the lower end of the operating lever 36. This lever 36 is mounted adjacent to the driver's seat 38 of the vehicle, indicated by dot and dash lines in Figs. 1 and 2. It will be seen that by pulling rearwardly on this lever the rod 34 will be drawn forwardly rocking the shaft 33 and drawing the rods 30 and the arms 28 forwardly thus swinging the brake shoe 20 downwardly and rearwardly to a position where it will be gripped between the wheel and the ground to stop the vehicle.

Forming a portion of the brackets 25 and extending rearwardly are arms 40 carrying bumpers 41, against which the arms 28 of the brake shoe-levers rest when in inoperative position. A tension spring 42 attached to this portion of the bracket and to the arm 28 tends to hold the brake shoe in the idle position shown in Fig. 1. If desired, either spring 23 or 42 may be omitted and a single spring relied on to perform the functions of both springs shown.

The operation of this form of my device is as follows: The driver on seeing danger ahead, grasps the lever 36 and pulls it rearwardly. This action, through the rod 34, the rock shaft 32 and the rod 30, swings the brake shoes rearwardly until they come into contact with the ground, whereupon the wheels of the vehicle ride up onto them. Now the upper arm 28 of the lever, coming into contact with the rubber bumper, limits any further rearward movement of the brake shoe with relation to the vehicle wheel and causes the brake shoe to slide along the ground with a portion of the weight of the vehicle resting thereon, thus very effectually stopping its forward movement. After the vehicle has been thus brought suddenly to a stop, there is a backward rebound of the vehicle which causes the wheels to roll off from the brake shoes and again rest upon the ground, allowing the springs 42 to return the parts to their normally idle position. This backward movement or rebound of the vehicle is assisted by the wedge shape of the brake shoes, which causes the wheels to have a tendency to roll backward off from them, onto the ground. If however, the vehicle is stopped on a sharp down grade, by means of this brake, and does not, because of the grade, move backward off from the brake shoes, it is only necessary to reverse the engine, driving the vehicle backward a slight distance allowing the wheels to roll onto the ground, and the parts comprising the brake to return to their normal position as described. There is a quick forward movement of the lever 18 from the point where the brake shoe is gripped between the wheel and the ground, until the lever is brought to a stop against the rubber bumper. To prevent this action unpleasantly jarring the operator's arm, the chain 35 is provided, which allows the rod 34 to move forward quickly without transmitting movement to the lever 36.

In Figs. 5, 6 and 7, I have shown a modified form of my brake, which allows the brake to be released after it has been applied, before the vehicle has been brought to a complete stop. That is, the brake may be applied to bring the vehicle very quickly from any comparatively high speed to any desired slower speed and then released at the will of the driver, allowing the vehicle to continue in its forward movement, while the brake mechanism automatically resumes its idle position. In this form each arm of the lever 18 carries a brake shoe 20. These brake shoes are adapted to be revolved about the wheel from a position in front of it to braking position, on the ground, and then released, whereupon it revolves to idle position at the rear of the wheel. Any convenient number of brake shoes may be used, each one in turn being brought to the forward side of the wheel, used for braking and then swung to the rear of the wheel, at the same time bringing the next one into readiness for use. In place of the springs 23, springs 45 are provided on each side of the block 15 which press outwardly against each end of the yoke 17. These springs are so constructed that they balance one another, and normally hold each of the shoes 20 away from the wheel. Mounted on one side of the yoke 17 and rigidly secured to it is a ring 46 against which the lower arm 48 of a lever, pivotally attached to the frame 50, is adapted to bear. Rearward movement of this arm against the ring shoves the lever 18 rearwardly bodily and thus brings the brake shoe, standing at the right or forward at the side of the wheel, into frictional engagement with the tire, whereupon the shoe revolves with the wheel (in the direction of the arrow in Fig. 5) from the normally idle position to the operative position indicated by broken lines in this figure. The lever 49 has an upwardly extending arm 51, to which is pivotally attached one end of a rod 52. This rod leads forwardly and is pivoted to the lower arm 53 of a hand lever 55, adjacent to the driver's seat. The lever 55 is shown as pivotally mounted on a bracket 56 which has a toothed segment 57 adapted to be engaged by a dog 58, carried by the lever and controlled by the grip 59 adjacent the handle thereof. When one of the brake shoes is brought to the operative position, by means of the hand lever 55 and the connections described, the opposite arm of the lever 18 engages a rubber bumper 60 (corresponding to the bumper 27 of the other form) carried on a slide 61 which is mounted in a suitable guideway 62, rigidly secured to the frame 13. Extending through a slot 64 in the upper portion of this guideway 62 is a pin 65 mounted on the slide 61. In engagement with this pin, is a slotted arm 66 of a lever pivoted at 67 and having a forwardly extending arm 68. This arm 68 is provided with a longitudinal slot 69 through which extends the rounded portion of the arm 51 of the lever 49. Now this slotted arm 68 extends diagonally across the path of the arm 51; accordingly when the arm 51 is moved forwardly or backwardly it causes the lever arm 68 to be moved toward or away from the frame of the machine, at the same time by means of the arm 66 moving the slide 61, carrying the bumper 60.

It will be seen that by the described arrangement, when the arm 51 is moved forwardly, by means of the lever 55 to apply the brake, the lever arm 68 will be moved inwardly toward the machine, and the slide 61 will be moved outwardly bringing the bumper into the path of one arm of the lever 18. The rotary movement of this lever will be thus stopped with one of the brake shoes between the wheel of the vehicle and the ground. To hold the lever 18 normally in a horizontal position, as shown in Fig. 5, I provide a detent arm 70, rigidly carried by the lever 49, and having at its free end a straight edge 71 adapted to engage the yoke-portion 17 of the lever 18. This detent arm stands just out of the path of the arms 18, at the same time being in alinement with the thickened portion of the yoke 17. Now when the lever 49 is swung to operate the brake, the upper arm 51 of this lever swings forwardly, and the detent arm is carried upwardly out of the path of the thickened portion of the yoke 17, allowing the arms 18 to swing by the frictional engagement of the brake shoe with the wheel, as heretofore described. A suitable spring, as the spring 73 attached to the arm 48 and to the frame 13 of the vehicle, causes a downward pressure on the edge 71 of the detent arm, thus normally holding the lever carrying the brake shoes in the idle position. This spring also acts to return the lever and the parts connected therewith to their normal or idle position, after each application of the brake.

The operation of this form of my device is as follows: The operator pulls the lever 55 rearwardly, causing the arm 48 to engage the ring 46 and press one of the brake shoes 20 against the forward position of the tire of the wheel 10. This engagement causes the brake shoe to revolve with the wheel until it is gripped between the ground and the wheel, thus raising the wheel entirely free from the ground. Now when the lever arm 48 swings rearwardly, the lever arm 68 is swung inwardly by means of the arm 51 engaging the slot therein and the arm 66 swings outwardly bringing the slide 61 carrying the bumper 60 into the path of one arm of the lever 18. This rigidly stops the movement of the brake shoe with relation to the vehicle wheel, and thus very effectively brings the car to a slower speed or to a stop. When the lever 55 is swung rearwardly, to apply the brakes, the dog 58 engaging the segment 57 securely holds the parts in their operative position. If the operator wishes to release the brake after the vehicle has been slowed down to a suitable speed, or come to a stop, he has merely to release the dog 58 by means of the grip 59 and push the lever 55 forwardly which through the connections described moves the arm 66 to draw the bumper 60 out of the path of the lever 18 allowing the wheel to ride across the brake shoe, which then revolves to idle position at the rear of the wheel bringing the other brake shoe into position for the next application of the brake and allowing the vehicle to continue in its forward movement. As soon as the parts are thus released, the action of the spring 73 brings the detent arm 70 against the yoke which stops the lever in its horizontal position camming it into that position if momentum has not carried it there, while the springs 45 automatically position the brake shoes away from the surface of the wheel.

It will be seen from the foregoing description that I have provided a very efficient emergency brake, particularly adapted for automobiles.

My device is simple to construct, comprises but few parts, and is readily applicable to existing vehicles.

In the embodiment first described, my brake may be used to bring the vehicle to an abrupt stop at any time of danger, and the parts may be readily replaced to inoperative position after the vehicle has been stopped.

In the embodiment of the other form described, my brake may be used to abruptly retard the car in its forward progress while allowing the vehicle to proceed at any desired slower speed upon releasing the brake, or may be used to entirely stop the vehicle. In either instance the parts automatically return to inoperative position upon the further movement of the vehicle, after releasing the brake.

Having thus described my invention what I claim is:

1. In a vehicle brake, the combination of a brake shoe adapted to engage the vehicle wheel, an arm carrying the brake shoe slidably and pivotally mounted on an axle of the vehicle, a resilient member interposed between the axle and the arm to hold the shoe normally out of engagement, a lever adjacent to the driver's seat, means operated by said lever to cause the brake shoe to be brought into contact with the periphery of the wheel to move it from idle position to a position beneath the wheel, and a yielding stop for limiting the movement of the shoe.

2. In a vehicle brake, the combination of a brake shoe adjacent to the wheel, an arm carrying the brake shoe having a yoked portion around an axle of the vehicle whereby it is slidably and pivotally mounted thereon, an extension on said arm, a lever adjacent to the driver's seat, and means operated by said device for causing the brake shoe to be brought into engagement with the periphery of the wheel to move it from idle position to a position beneath the wheel, and a yielding stop engaging said extension on said arm.

3. In a vehicle brake, the combination of a plurality of brake shoes adapted to make a complete revolution on an axle of the vehicle adjacent to a wheel, means for holding the brake shoes normally in idle position, and means controlled from the seat of the driver for bringing a brake shoe to a position between the wheel and the ground.

4. In a vehicle brake, the combination of a plurality of brake shoes revolubly mounted on an axle of the vehicle adjacent to a wheel, means for normally holding the brake shoes in idle position, and means controlled from the seat of the driver for bringing one of said shoes into operative position between the wheel and the ground, and a stop for holding said shoe in its operative position, said stop being movable into or out of operative position.

5. In a vehicle brake, the combination of a plurality of brake shoes, arms carrying said brake shoes pivotally mounted on an axle of the vehicle adjacent to a wheel whereby they may be swung into position between the wheel and the ground, a movable stop adapted to be brought into and out of the path of said arms, and means controlled from the seat of the driver for determining the position of the brake shoes and said stop.

6. In a vehicle brake, the combination of a plurality of brake shoes, arms carrying said brake shoes adjacent the tire of a wheel, said arms being slidably and pivotally mounted on the axle of the vehicle adjacent a wheel, and means controlled from the seat of the driver for bringing one of said shoes against the tire to revolve it to a position between the wheel and the ground.

7. The combination in a vehicle brake, of a plurality of brake shoes, arms carrying said brake shoes slidably and pivotally mounted upon an axle of the vehicle adjacent a wheel, means for holding them normally in idle position, and means for bringing one of said brake shoes into contact with the tire to revolve it to a position between the wheel and the ground, and a slidable stop engaging one of said arms at a time to hold a brake shoe in its operative position, said stop and the position of the brake shoes being controlled from the seat of the driver.

8. In a vehicle brake, the combination of a plurality of brake shoes mounted on radial arms pivotally and slidably mounted on an axle adjacent a wheel, said brake shoes being carried adjacent the tires, and means for sliding said arms to bring one of said brake shoes into contact with the tire while running, said means being operated by a lever adjacent to the driver's seat, means controlled by said lever for normally holding the brake shoes in idle position, and a stop engaging one of said arms when one of the brake shoes is in operative position, said stop being movable and controllable by said lever.

9. In a vehicle brake, the combination of a brake shoe adapted to make a complete revolution, on an axle of the vehicle adjacent to a wheel, means for holding the brake shoe normally in an idle position, and means controlled from the seat of the driver for drawing the brake shoe to a position between the wheel and the ground.

10. In a vehicle brake, the combination of a brake shoe mounted on an axle of the vehicle adjacent to a wheel and adapted to make a complete revolution thereon, means for normally holding the brake shoe in an idle position, means controlled from the seat of the driver for drawing one of said shoes into operative position between the wheel and the ground, and a stop for holding said shoe in its operative position, said stop being movable into or out of operative position.

In testimony whereof, I hereunto affix my signature in the presence of two witnesses.

OSCAR ZERK.

Witnesses:
ALBERT H. BATES,
BRENNAN B. WEST.